(12) United States Patent
Dorenbosch et al.

(10) Patent No.: US 6,298,054 B1
(45) Date of Patent: Oct. 2, 2001

(54) METHOD AND APPARATUS IN A WIRELESS MESSAGING UNIT FOR ACQUIRING TRANSMITTER OR RECEIVER SYNCHRONIZATION

(75) Inventors: Jheroen Pieter Dorenbosch, Paradise; Slim Souissi, Fort Worth, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/163,732

(22) Filed: Sep. 30, 1998

(51) Int. Cl.[7] ........................................................ H04J 3/06
(52) U.S. Cl. ........................... 370/350; 370/503; 375/134
(58) Field of Search ......................................... 375/132, 133, 375/134, 135, 137, 261, 340, 354, 357, 138, 145, 149; 370/324, 350, 347, 503, 507, 513, 330, 338, 343; 340/825.44; 455/422, 503, 517

(56) References Cited

U.S. PATENT DOCUMENTS 5,381,443 * 1/1995 Borth et al. ......................... 375/134
5,425,049 * 6/1995 Dent ..................................... 375/132
5,684,794 * 11/1997 Lopez et al. ......................... 370/337

* cited by examiner

*Primary Examiner*—Chau Nguyen
*Assistant Examiner*—Inder Pal Mehra
(74) *Attorney, Agent, or Firm*—R. Louis Breeden

(57) ABSTRACT

A wireless messaging unit (122) determines (704) that a first channel (402), which utilizes a first plurality of time slots for transmission, does not have a signal suitable for acquiring synchronization; and, in response, attempts (706) to acquire an initial synchronization with a second channel (404) which periodically transmits a synchronization signal (406) in a second plurality of time slots having a predetermined timing relationship with the first plurality of time slots. After acquiring the initial synchronization, the wireless messaging unit applies (708) the predetermined timing relationship to the initial synchronization to establish a secondary synchronization with the first channel.

22 Claims, 7 Drawing Sheets

METHOD AND APPARATUS IN A WIRELESS MESSAGING UNIT FOR ACQUIRING TRANSMITTER OR RECEIVER SYNCHRONIZATION

FIELD OF THE INVENTION

This invention relates in general to wireless communication systems, and more specifically to a method and apparatus in a wireless messaging unit for acquiring transmitter or receiver synchronization.

BACKGROUND OF THE INVENTION

Synchronous messaging protocols, such as Motorola's FLEX™ protocol for a messaging system, require the periodic transmission of synchronization signals so that the wireless messaging units used in the messaging system can maintain synchronization with the system. The FLEX™ protocol, for example, requires a synchronization word at the beginning of each frame, i.e., every 1.875 seconds.

Some existing and proposed systems can encounter difficulties in providing sufficient synchronization signals to keep the wireless messaging units synchronized. Examples are: shared systems, high speed Quadrature Amplitude Modulation (QAM) systems, frequency-hopped spread-spectrum (FHSS) systems, and two-way systems. In a shared system, the synchronization signals of one system are interrupted when the other system uses the channel. In QAM systems, for best efficiency the designers prefer to use only a QAM sync, but a QAM sync is more difficult to acquire than a frequency-shift-keyed (FSK) sync. In a FHSS system, if synchronization is lost, the receiver will have great difficulty finding where in the frequency hopping sequence the transmitted signal is, and scanning will be lengthy. In a two-way system, the wireless messaging units' inbound transmissions are synchronized with the outbound transmissions. Maintaining synchronization between widely separated synchronization signals calls for expensive crystals in the wireless messaging units.

Thus, what is needed is a method and apparatus in a wireless messaging unit for establishing transmitter or receiver synchronization. Preferably, the method and apparatus will not add great expense to the wireless messaging unit.

SUMMARY OF THE INVENTION

An aspect of the present invention is a method in a wireless messaging unit for establishing receiver synchronization with a first channel which utilizes a first plurality of time slots for transmission. The method comprises the steps of determining that the first channel does not have a signal suitable for acquiring receiver synchronization; and, in response, attempting to acquire an initial synchronization with a second channel which periodically transmits a synchronization signal in a second plurality of time slots having a predetermined timing relationship with the first plurality of time slots. The method further comprises the step of, after acquiring the initial synchronization, applying the predetermined timing relationship to the initial synchronization to establish a secondary synchronization with the first channel.

Another aspect of the present invention is a wireless messaging unit for establishing receiver synchronization with a first channel which utilizes a first plurality of time slots for transmission. The wireless messaging unit comprises a receiver for receiving a message, and a processing system coupled to the receiver for processing the message. The processing system is programmed to cooperate with the receiver to determine that the first channel does not have a signal suitable for acquiring receiver synchronization; and, in response, to attempt to acquire an initial synchronization with a second channel which periodically transmits a synchronization signal in a second plurality of time slots having a predetermined timing relationship with the first plurality of time slots. The processing system is further programmed to, after acquiring the initial synchronization, apply the predetermined timing relationship to establish a secondary synchronization with the first channel.

Another aspect of the present invention is a method in a wireless messaging unit for establishing transmitter synchronization with a first channel utilizing a first plurality of time slots, wherein a message is to be transmitted as a frequency-hopped, spread-spectrum signal having a predetermined frequency-hopping sequence. The method comprises the step of attempting to acquire an initial synchronization with a second channel which periodically transmits a synchronization signal in a second plurality of time slots having a predetermined timing relationship with the first plurality of time slots, wherein the synchronization signal includes an identification number for uniquely identifying an order of transmission of the synchronization signal within a predetermined repeating cycle of transmissions. The method further comprises the steps of, after acquiring the initial synchronization, applying the predetermined timing relationship to the initial synchronization to establish a secondary synchronization with the first channel, and calculating from the identification number a point in the predetermined frequency-hopping sequence to use for beginning to transmit the message.

Yet another aspect of the present invention is a wireless messaging unit, comprising a transmitter for transmitting a message as a frequency-hopped, spread-spectrum signal on a first channel in a first plurality of time slots having a predetermined frequency-hopping sequence, and a processing system coupled to the transmitter for controlling the transmitter. The processing system is programmed to cooperate with the transmitter to attempt to acquire an initial synchronization with a second channel which periodically transmits a synchronization signal in a second plurality of time slots having a predetermined timing relationship with the first plurality of time slots. The synchronization signal includes an identification number for uniquely identifying an order of transmission of the synchronization signal within a predetermined repeating cycle of transmissions. The processing system is further programmed to, after acquiring the initial synchronization, apply the predetermined timing relationship to the initial synchronization to establish a secondary synchronization with the first channel, and to calculate from the identification number a point in the predetermined frequency-hopping sequence to use for beginning to transmit the message.

DETAILED DESCRIPTION OF THE DRAWINGS

Figure 1:
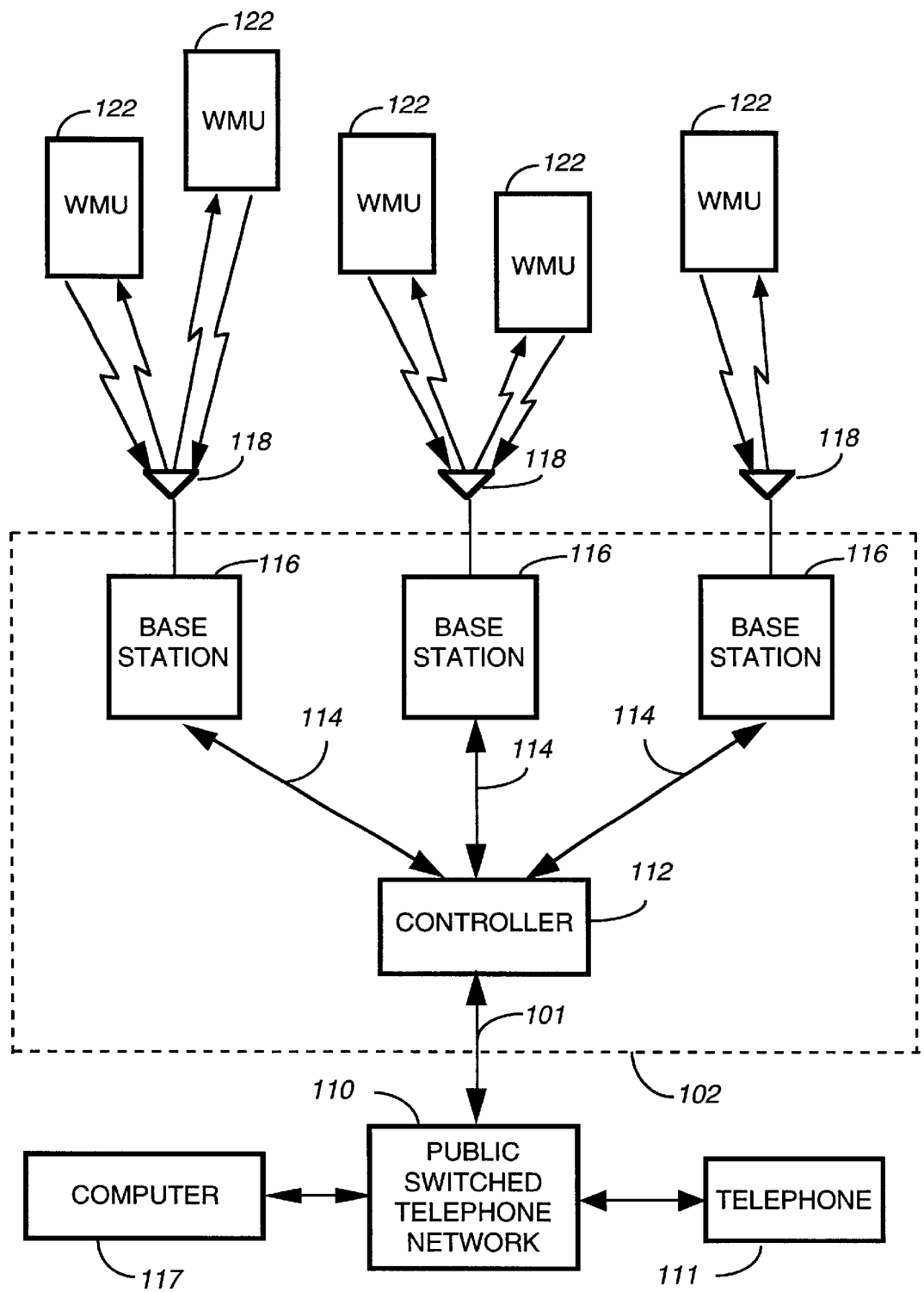
FIG. 1 is an electrical block diagram of an exemplary wireless messaging system in accordance with the present invention.

Referring to FIG. 1, an electrical block diagram depicts an exemplary two-way wireless messaging system in accordance with the present invention, comprising an infrastructure portion 102 including a conventional controller 112 and a plurality of base stations 116, the communication system also including a plurality of wireless messaging units 122. The base stations 116 preferably communicate with the wireless messaging units 122 utilizing conventional radio frequency (RF) techniques, and are coupled by conventional communication links 114 to the controller 112, which controls the base stations 116.

The controller 112 is preferably similar to a combination of the Wireless Messaging Gateway (WMG™) Administrator! paging terminal, and the RF-Conductor!™ message distributor manufactured by Motorola, Inc. The base stations 116 are preferably a combination of the RF-Orchestra! transmitter and RF-Audience!™ receivers manufactured by Motorola, Inc. The hardware of the wireless messaging units 122 is preferably similar to that of the PageWriter™ 2000 data messaging units, also manufactured by Motorola, Inc. The software of the wireless messaging units 122 is modified in accordance with the present invention, as described further below. It will be appreciated that other similar hardware can be utilized as well for the controller 112, the base stations 116, and the wireless messaging units 122.

Each of the base stations 116 transmits RF signals to the wireless messaging units 122 via an antenna 118. The base stations 116 preferably each receive RF signals from the plurality of wireless messaging units 122 via the antenna 118. The RF signals transmitted by the base stations 116 to the wireless messaging units 122 (outbound messages) comprise selective call addresses identifying the wireless messaging units 122, and data messages originated by a caller, as well as commands originated by the controller 112 for adjusting operating parameters of the radio communication system. The RF signals preferably transmitted by the wireless messaging units 122 to the base stations 116 (inbound messages) comprise responses that include scheduled messages, such as positive acknowledgments (ACKs) and negative acknowledgments (NAKs), and unscheduled messages, such as registration requests.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117 coupled to the PSTN 110. The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well. It will also be appreciated that the wireless messaging system can include multiple independent controllers 112. It will be further appreciated that many aspects of the present invention can be applied to one-way messaging systems as well.

Figure 2:
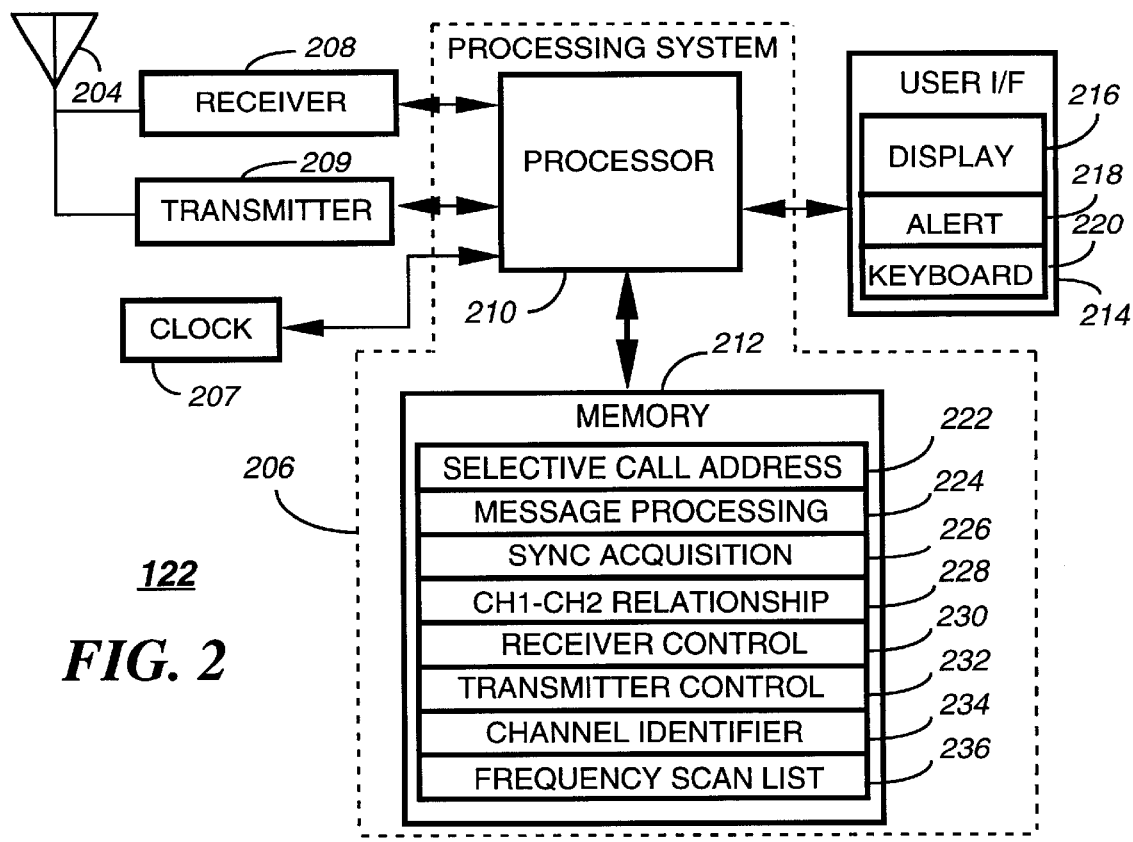
FIG. 2 is an electrical block diagram of an exemplary wireless messaging unit in accordance with the present invention.

FIG. 2 is an electrical block diagram of an exemplary wireless messaging unit 122 in accordance with the present invention. The wireless messaging unit 122 comprises an antenna 204 for intercepting an outbound message and for transmitting an inbound message. The antenna 204 is coupled to a conventional receiver 208 for receiving the outbound message and coupled to a conventional transmitter 209 for transmitting the inbound message. The receiver 208 and the transmitter 209 are coupled to a processing system 206 for processing the outbound and inbound messages and for controlling the wireless messaging unit 122 in accordance with the present invention. A user interface 214 preferably is also coupled to the processing system 206 for interfacing with a user. The user interface 214 preferably comprises a conventional display 216 for displaying the inbound and outbound messages, a conventional alert element 218 for alerting the user when the outbound message arrives, and a conventional keyboard 220 for generating the inbound message and for controlling the wireless messaging unit 122. A conventional clock 207 is also coupled to the processing system 206 for supporting time keeping requirements of the wireless messaging unit 122. It will be appreciated that, alternatively, for some applications, e.g., meter reading and vending machine status-reporting, the user interface is replaced with a machine interface.

The processing system 206 comprises a conventional processor 210 and a conventional memory 212. The memory 212 comprises software elements and other variables for programming the processing system 206 in accordance with the present invention. The memory 212 preferably includes a selective call address 222 to which the wireless messaging unit 122 is responsive. In addition, the memory 212 includes a message processing program 224 for programming the processing system 206 to process messages through well-known techniques. The memory 212 further comprises a synchronization acquisition program 226 for programming the processing system 206 to acquire synchronization in accordance with the present invention. The memory 212 also includes a first channel to second channel relationship program 228 for storing a predetermined timing relationship between first and second pluralities of time slots. The memory 212 further comprises a receiver control program 230 for programming the processing system 206 to control the receiver 208 in accordance with the present invention. In addition, the memory 212 includes a transmitter control program 232 for programming the processing system 206 to control the transmitter 209 in accordance with the present invention. Also, the memory 212 includes a channel identifier 234 for identifying a system from which the wireless messaging unit is to receive a second channel. The memory 212 further includes a frequency scan list 236 for identifying frequencies to be scanned to locate first and second channels. Operation of these and other elements of the present invention are described further below.

Figure 3:
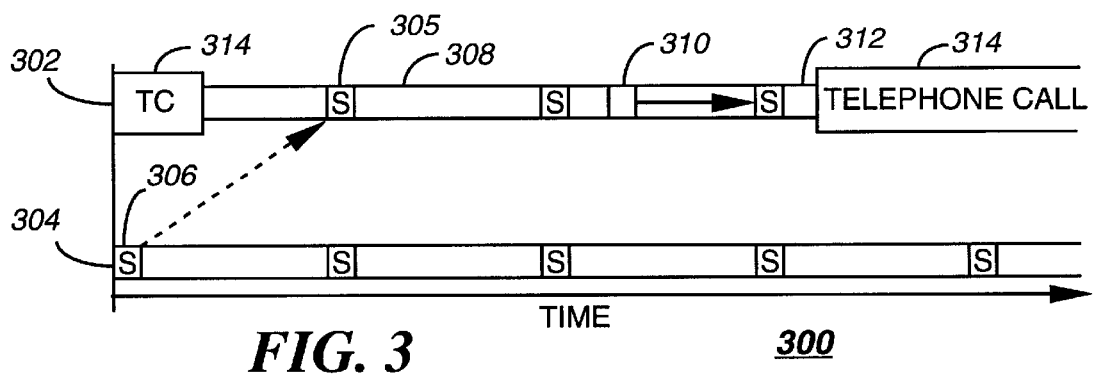
FIG. 3 is a timing diagram depicting operation of a shared cellular and messaging system in accordance with the present invention.

FIG. 3 is a timing diagram 300 depicting operation of a shared cellular and two-way messaging system in accordance with the present invention. The diagram 300 includes a shared channel 302, shared between a cellular telephone system and a messaging system, and a dedicated messaging channel 304. In this system, a telephone call 314 has priority over messaging system transmissions. Thus, the synchronization signals 305 of the messaging system are unavailable during telephone calls 314. At such times, the wireless messaging units 122 that receive their messages on the shared channel 302 attempt to acquire synchronization with the dedicated messaging channel 304. Then, the wireless messaging units 122 wait for a System Control Frame 308 to appear on the shared channel 302. When the System Control Frame 308 appears, the wireless messaging units 122 receive control information and then can receive addresses and vectors 310 directing them to any messages 312 they may have. Of course, it is possible for a message 312 to be interrupted by another telephone call 314, in which case the wireless messaging unit 122 responds with a negative acknowledgment, and the system resends the message when the channel becomes available. It will be appreciated that the messaging signals of the shared channel 302 and the dedicated messaging channel 304 must have a predetermined timing relationship with one another. This can be accomplished by synchronizing both channels with a standard timing reference such as a Global Positioning Satellite (GPS). Other than the predetermined timing relationship (as required by the FLEX™ family of protocols), the shared channel 302 and the dedicated messaging channel 304 are not required to be related; they can even be operated by two different service providers.

Figure 4:
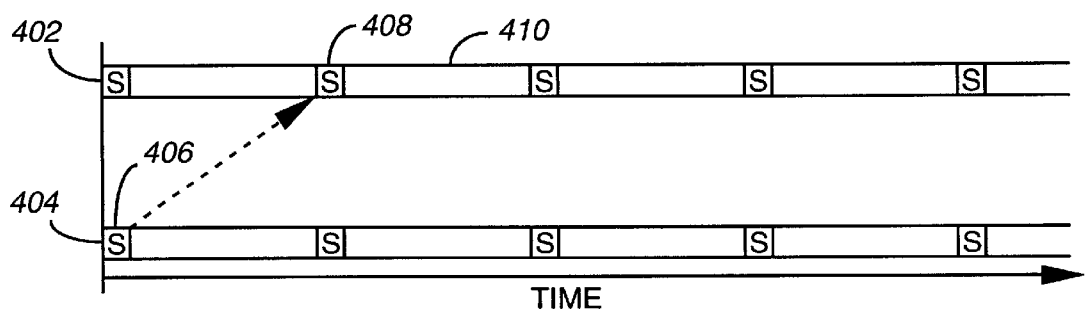
FIG. 4 is a timing diagram depicting operation of a quadrature amplitude modulated (QAM) system in accordance with the present invention.

FIG. 4 is a timing diagram 400 depicting operation of a quadrature amplitude modulated (QAM) system in accordance with the present invention. The diagram 400 includes a QAM channel 402 and a traditional messaging channel 404, preferably utilizing a FLEX™ family protocol. The QAM channel 402 includes QAM synchronization signals 408 at the beginning of each QAM frame 410. The QAM synchronization signals 408 are used for fine synchronization, but are not intended for initial acquisition of synchronization, which is preferably done through a frequency-shift-keyed (FSK) synchronization signal. The wireless messaging units 122 in this system thus monitor the traditional messaging channel 404 to acquire a rough synchronization and then tune to the QAM channel 402 to establish fine synchronization with the QAM frames 410. Of course, there has to be a known timing relationship between the time slots of the QAM channel 402 and the traditional messaging channel 404. Again, this is easily accomplished by synchronizing both channels with a time reference, such as GPS; and, furthermore, the channels are not required to be related in any other way and can even be operated by different service providers.

Figure 5:
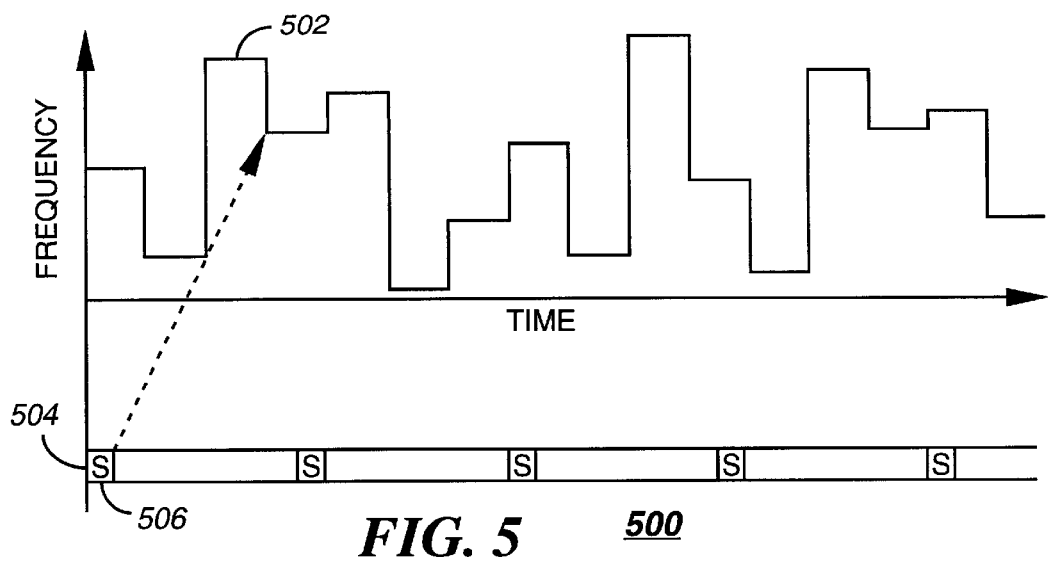
FIG. 5 is a timing diagram depicting operation of a frequency-hopped spread-spectrum system in accordance with the present invention.

FIG. 5 is a timing diagram 500 depicting operation of a frequency-hopped spread-spectrum system in accordance with the present invention. The diagram 500 shows that the carrier frequency is different for each new time slot of the frequency hopping channel 502 according to a predetermined frequency hopping pattern, which preferably repeats every hour. The frequency hopping preferably occurs at a relatively slow pace, e.g., one hop per packet of data. The diagram 500 also depicts a traditional messaging channel 504, preferably utilizing a FLEX™ family protocol. The wireless messaging units 122 utilizing the frequency hopping channel 502 first monitor the traditional messaging channel 504 to acquire synchronization with the synchronization signals 506. Because there is a predetermined timing relationship between the traditional messaging channel 504 and the frequency hopping channel 502, the initial synchronization acquired from the synchronization signals 506 can be used to establish a secondary synchronization with the frequency hopping channel 502. The wireless messaging units 122 then preferably decode the cycle number and frame number included in the synchronization signal. From these numbers the wireless messaging units 122 compute a corresponding point in the predetermined frequency hopping pattern for beginning to receive the frequency hopping channel 502.

Figure 6:
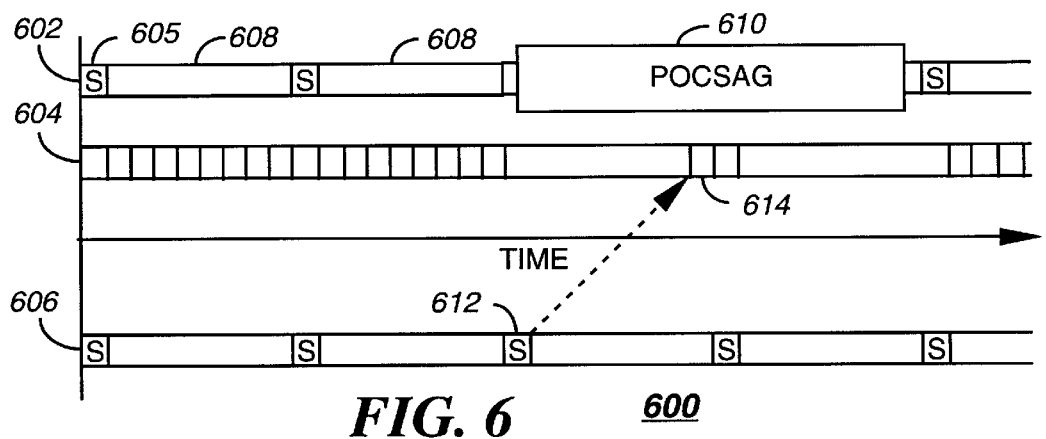
FIG. 6 is a timing diagram depicting operation of a shared FLEX and POCSAG system in accordance with the present invention.

FIG. 6 is a timing diagram 600 depicting operation of a shared FLEX™ two-way and POCSAG system in accordance with the present invention. The diagram 600 shows a shared outbound channel 602 having a mix of FLEX™ frames 608 and POCSAG transmissions 610. The diagram 600 also depicts an inbound messaging channel 604 associated with the shared outbound channel 602, and a separate dedicated messaging channel 606. Because of interruptions of the synchronization signals 605 of the shared outbound channel 602 by the POCSAG transmissions 610, the wireless messaging units 122 do not have a reliable source of synchronization from the shared outbound channel 602 for use with the inbound messaging channel 604. To compensate, the wireless messaging units 122 advantageously obtain synchronization from the synchronization signals 612 of the dedicated messaging channel 606 to synchronize inbound transmissions 614. As pointed out earlier, the only relationship the separate dedicated messaging channel 606 has to have with the other two channels 602, 604 is a predetermined timing relationship, which FLEX™ channels normally are required to have anyway.

Figure 7:
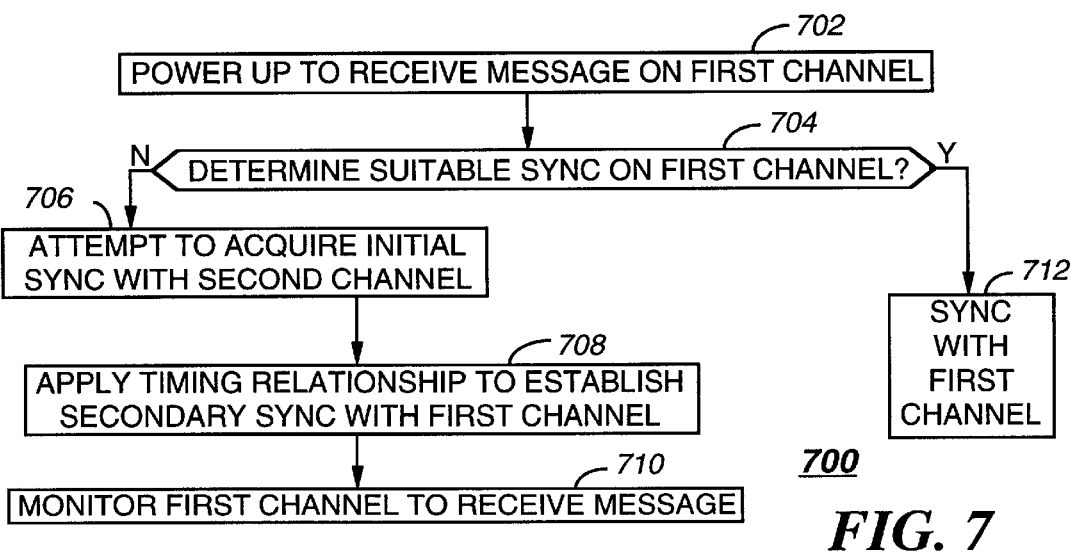
FIGS. 7–14 are flow diagrams depicting operation of various embodiments of the exemplary wireless messaging unit in accordance with the present invention.

FIG. 7 is a flow diagram 700 depicting operation of a first embodiment of the exemplary wireless messaging unit 122 in accordance with the present invention. When the wireless messaging unit 122 powers up 702 (as well as when coverage has been lost, and when the unit 122 comes out of a battery-saving mode), it expects to receive a message on a first channel which utilizes a first plurality of time slots for transmission. It determines 704 whether a suitable synchronization signal, e.g., a FLEX™ protocol FSK sync, is available on the first channel. The determination can be made in several ways, depending on the type of wireless messaging unit 122. For example, if the wireless messaging unit 122 is an FSK unit, it can monitor the first channel to determine whether the sync is present. If the wireless messaging unit 122 is a QAM unit, it can assume that FSK sync is not on the first channel. Alternatively, the wireless messaging unit 122 memory 212 can be programmed with an indicator which indicates whether or not to expect sync on the first channel.

If the wireless messaging unit 122 determines that a suitable synchronization signal is available on the first channel, the wireless messaging unit 122 synchronizes 712 with the first channel, through well-known techniques. If, however, the wireless messaging unit 122 determines that the first channel does not have a signal suitable for acquiring synchronization, the wireless messaging unit 122 attempts 706 to acquire an initial synchronization with a second channel which periodically transmits a synchronization signal in a second plurality of time slots having a predetermined timing relationship with the first plurality of time slots, e.g., a common timing reference. After acquiring the initial synchronization, the wireless messaging unit 122 applies 706 the predetermined timing relationship to the initial synchronization to establish a secondary synchronization with the first channel. When the first and second channels use a common timing reference, for example, this is as simple as sync 1=sync 2. The wireless messaging unit 122 then monitors the first channel to receive the message. It will be appreciated that the first and second channels can use two different timing references, as long as any offset between the two timing references is made known to the wireless messaging unit 122, e.g., by announcing the timing offset in a control message.

Figure 8:
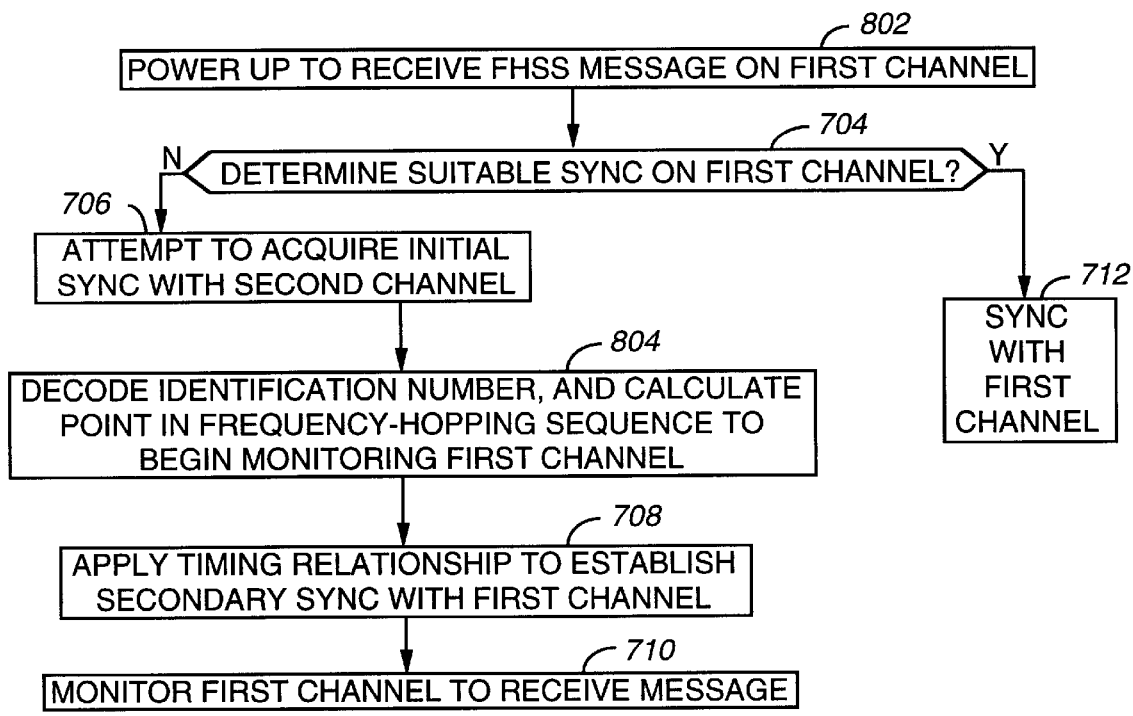

FIG. 8 is a flow diagram 800 depicting operation of a second embodiment of the exemplary wireless messaging unit 122 in accordance with the present invention. The flow diagram 800 is similar to the flow diagram 700, the essential differences being the first step 802 and a step 804 inserted between steps 706 and 708. In this embodiment, the receiver 208 is a conventional frequency-hopped spread-spectrum receiver controlled by the processing system 206 in accordance with the present invention. When powered up 802, the wireless messaging unit 122 expects to receive a frequency-hopped spread-spectrum message on the first channel. The hopping sequence preferably is a predetermined pseudo-random sequence that repeats at least hourly and is known to the wireless messaging unit 122. At step 804, after the wireless messaging unit 122 has acquired initial synchronization with the second channel, the wireless messaging unit 122 decodes an identification number included in the synchronization signal, the identification number for uniquely identifying an order of transmission of the synchronization signal within a predetermined repeating cycle of transmissions. For example, the synchronization word of the FLEX™ family of protocols identifies the cycle number and the frame number of each frame. These two numbers in combination form a sequence of identification numbers for identifying every frame sent during an hourly time period, and the sequence repeats each hour. From the identification number of the sync signal, the wireless messaging unit 122 calculates a point in the predetermined frequency-hopping sequence to use for beginning to monitor the first channel. In this manner, the wireless messaging unit 122 advantageously acquires not only timing synchronization, but also synchronization with the predetermined frequency-hopping sequence. It will be appreciated that, alternatively, the first channel can comprise a plurality of frequency-hopped channels, which are monitored in parallel by the wireless messaging unit 122.

Figure 9:
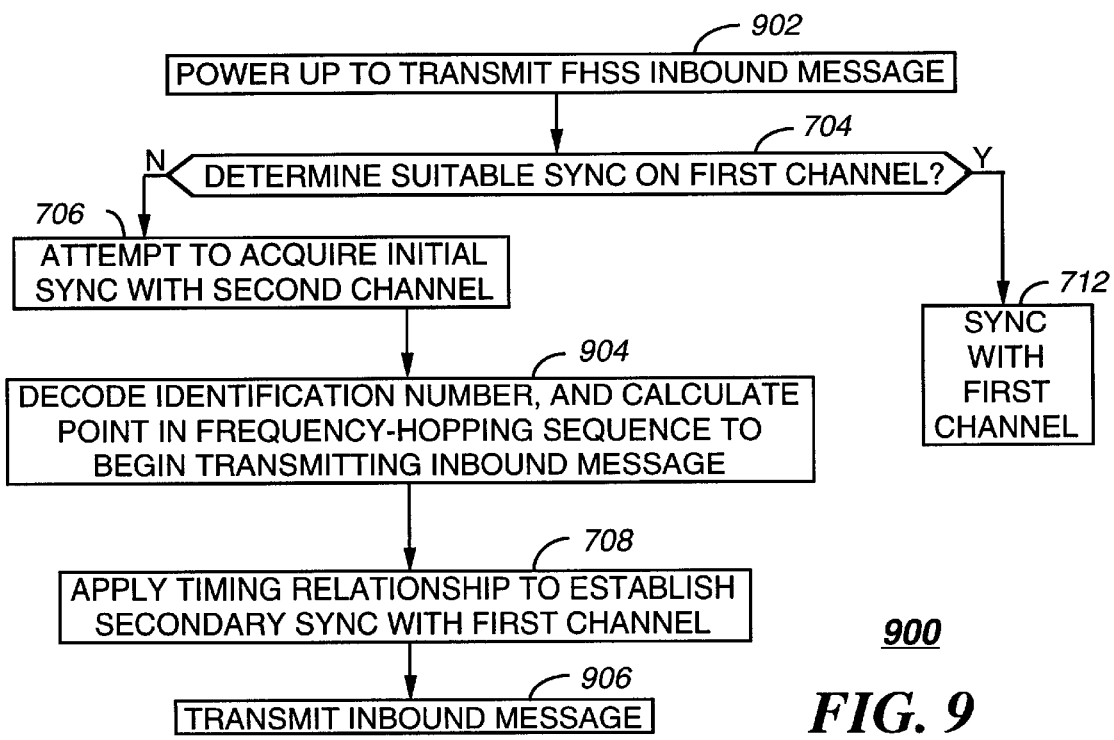

FIG. 9 is a flow diagram 900 depicting operation of a third embodiment of the exemplary wireless messaging unit 122 in accordance with the present invention. The flow diagram 900 is similar to the flow diagram 700, the essential differences being the first step 902, a step 904 inserted between steps 706 and 708, and the last step 906. In this embodiment, the transmitter 209 is a conventional frequency-hopped spread-spectrum transmitter controlled by the processing system 206 in accordance with the present invention. When powered up 902, the wireless messaging unit 122 expects to transmit a frequency-hopped spread-spectrum message on an inbound channel that needs to be synchronized with the outbound messages on the first channel. The hopping sequence preferably is a predetermined pseudo-random sequence that repeats at least hourly and is known to the wireless messaging unit 122. At step 904, after the wireless messaging unit 122 has acquired initial synchronization with the second channel, the wireless messaging unit 122 decodes the identification number included in the synchronization signal and calculates from the identification number a point in the predetermined frequency-hopping sequence to use for beginning to transmit the inbound message. After establishing secondary synchronization with the first channel, the wireless messaging unit 122 transmits 906 the inbound message. This embodiment can be advantageously combined with the second embodiment, for example, when both the outbound and inbound channels are frequency-hopped spread-spectrum channels, and when the second channel is an existing FLEX™ channel having an FSK synchronization signal.

Figure 10:
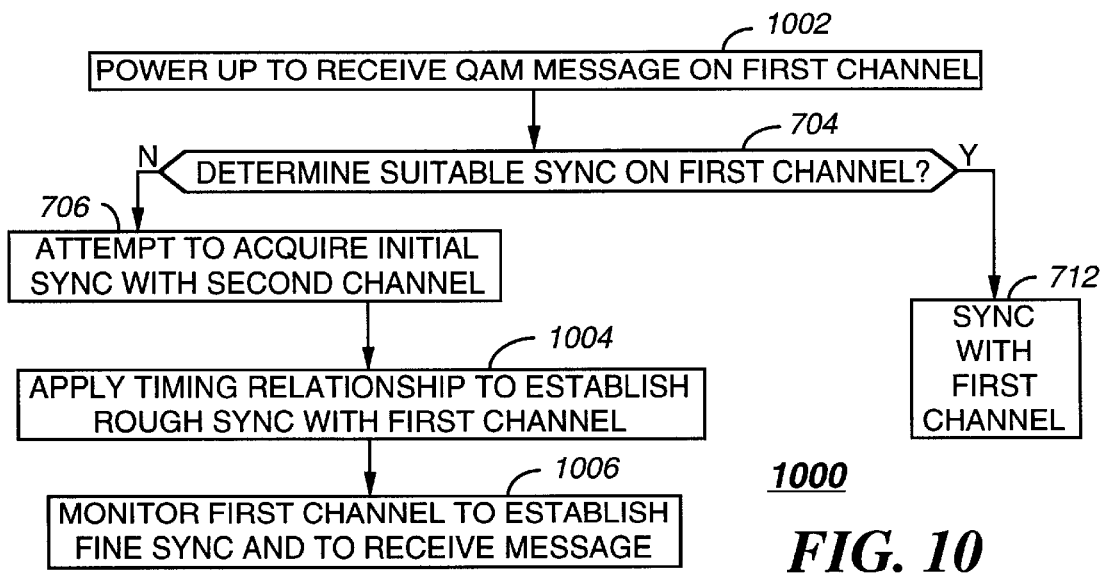

FIG. 10 is a flow diagram 1000 depicting operation of a fourth embodiment of the exemplary wireless messaging unit 122 in accordance with the present invention. The flow diagram 1000 is similar to the flow diagram 700, the essential differences being the first step 1002 and the last two steps 1004, 1006 after step 706. In this embodiment, the first channel is a QAM channel having a fine synchronization signal for establishing a fine synchronization after a rough synchronization has been acquired. The receiver 208 is a conventional QAM receiver controlled by the processing system 206 in accordance with the present invention. When powered up 1002, the wireless messaging unit 122 expects to receive a QAM message on the first channel. At step 1004, after acquiring initial synchronization with the second channel, the wireless messaging unit 122 applies the predetermined timing relationship between the first and second channels to establish the rough, or secondary, synchronization with the first channel. Then at step 1006 the wireless messaging unit 122 monitors the first channel to establish the fine synchronization with the first channel from the fine synchronization signal. This embodiment advantageously allows the QAM transmissions to operate without having to provide an FSK sync, thereby increasing the channel efficiency.

Figure 11:
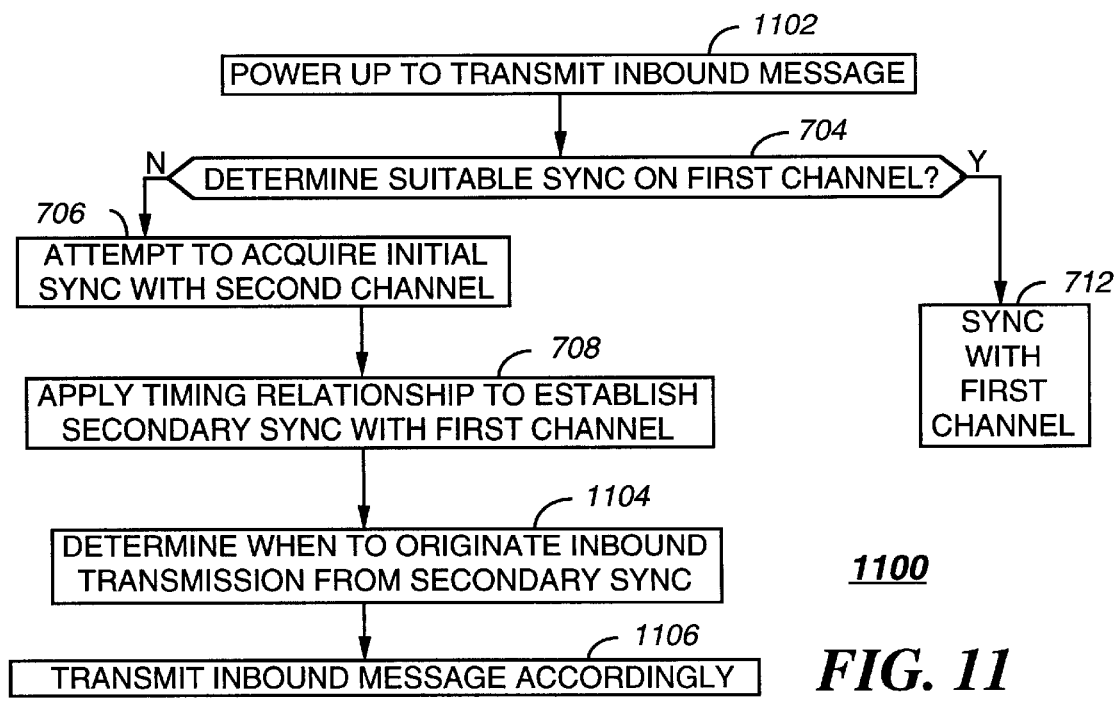

FIG. 11 is a flow diagram 1100 depicting operation of a fifth embodiment of the exemplary wireless messaging unit 122 in accordance with the present invention. The flow diagram 1100 is similar to the flow diagram 700, the essential differences being the first step 1102 and the last two steps 1104, 1106 after step 708. In step 1102 the wireless messaging unit 122 is powered up and wants to transmit an inbound message on an inbound channel at step 1104, after establishing the secondary synchronization with the first channel, the wireless messaging unit 122 determines when to originate the inbound message from the secondary synchronization. The wireless messaging unit 122 then transmits 1106 the inbound message accordingly. This embodiment is advantageous for shared two-way systems in which the outbound sync can be interrupted by a transmission of another system.

Figure 12:
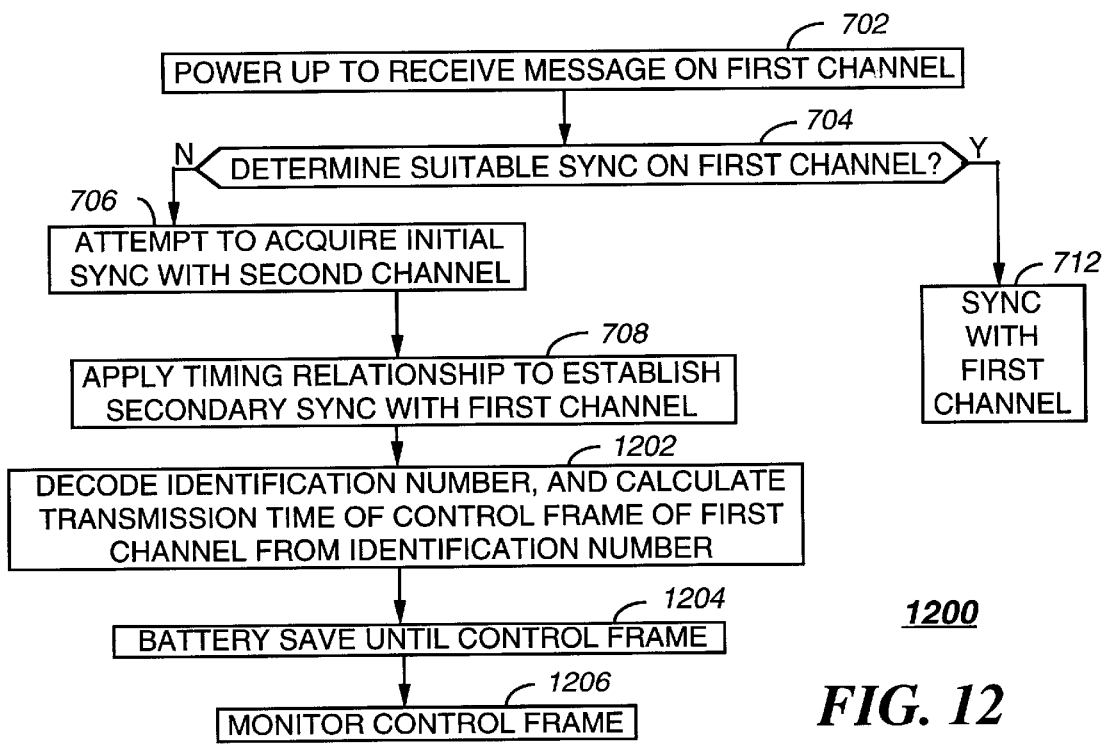

FIG. 12 is a flow diagram 1200 depicting operation of a sixth embodiment of the exemplary wireless messaging unit 122 in accordance with the present invention. The flow diagram 1200 is similar to the flow diagram 700, the essential differences being the last three steps 1202, 1204, 1206 after step 708. At step 1202 the wireless messaging unit 122 decodes the identification number of the synchronization signal of the second channel, and calculates therefrom the transmission time of a control frame of the first channel. The wireless messaging unit 122 then operates 1204 in a battery saving mode until the transmission time of the control frame arrives. The wireless messaging unit 122 then monitors 1206 the control frame. This embodiment advantageously increases battery life when the wireless messaging unit 122 is battery powered.

Figure 13:
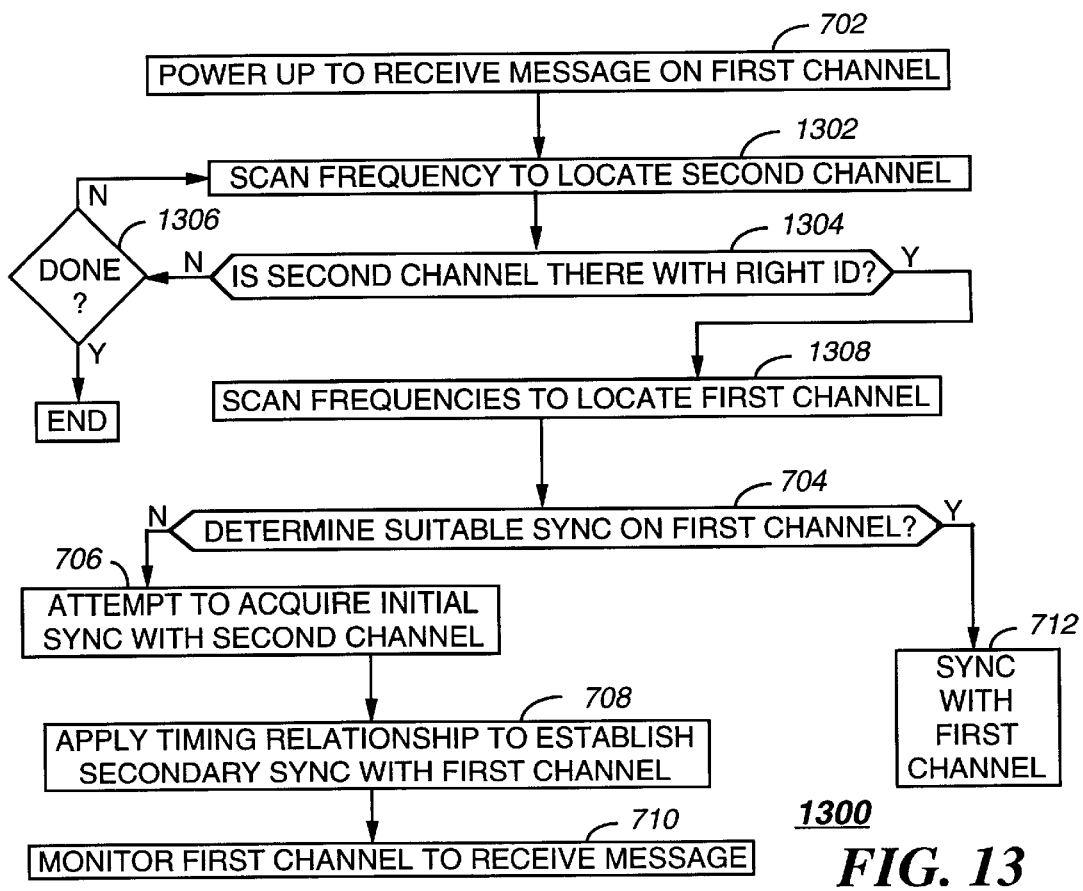

FIG. 13 is a flow diagram 1300 depicting operation of a seventh embodiment of the exemplary wireless messaging unit 122 in accordance with the present invention. The flow diagram 1300 is similar to the flow diagram 700, the essential difference being the four steps 1302–1308 inserted between steps 702 and 704. After powering up in step 702, the wireless messaging unit 122 scans 1302 a frequency to locate a suitable second channel. At step 1304 the wireless messaging unit 122 determines whether it located a second channel and whether the second channel was transmitting the channel identifier 234 identifying a system from which the wireless messaging unit 122 is programmed to receive the second channel. If the answer to either question is no, the wireless messaging unit 122 checks at step 1306 whether it has scanned all the second channel frequencies in the scan list 236. If so, the process ends. If not, the wireless messaging unit 122 returns to step 1302 to scan another frequency. If, on the other hand, at step 1304 the wireless messaging unit 122 has located a suitable second channel with the right identifier, then the wireless messaging unit 122 scans 1308 first channel frequencies (in a manner similar to steps 1302–1306) to locate the first channel. Flow then proceeds to step 704. This method of operation is advantageous, for example, when the first channels are high speed local area messaging systems of one's home, office, church, and so on, synchronized with a wide area messaging system, which covers all the high speed systems and provides the second channel for synchronization. When one leaves the wide area messaging system, there is no need to scan for the local area messaging systems, because they will not be found. Not scanning advantageously increases battery life.

Figure 14:
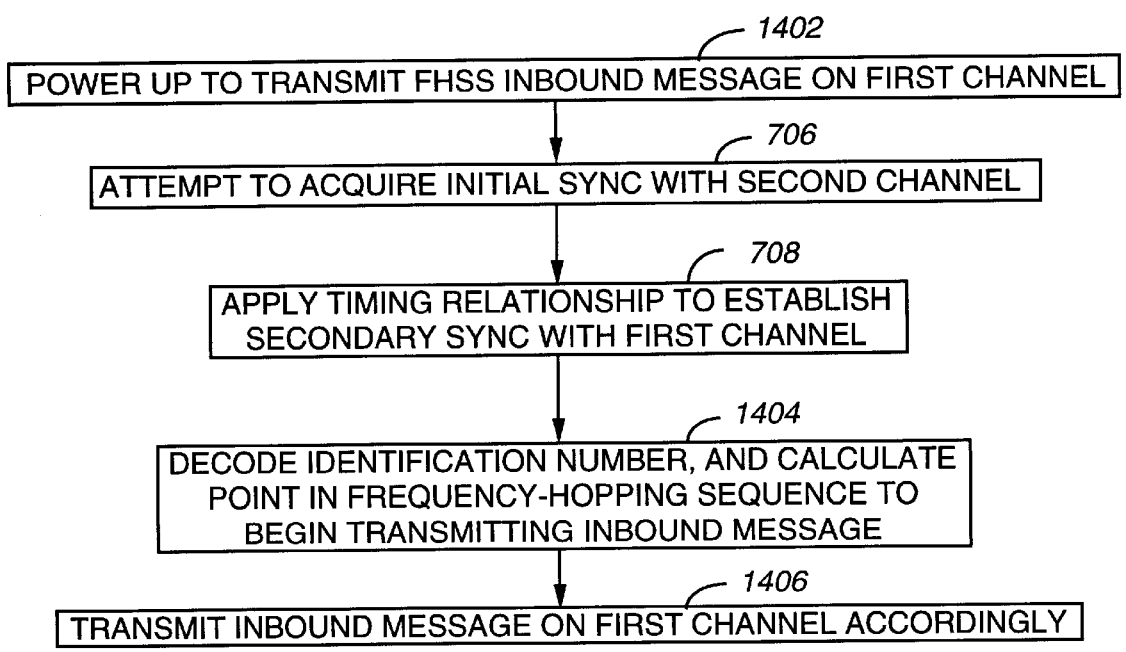

FIG. 14 is a flow diagram 1400 depicting operation of an eighth embodiment of the exemplary wireless messaging unit 122 in accordance with the present invention. The flow diagram 1400 retains the basic idea of acquiring synchronization from a second channel to establish a secondary synchronization with a first channel, as depicted in the diagram 700. At step 1402 the wireless messaging unit 122 powers up and expects to transmit an inbound message in a first plurality of time slots, as a frequency-hopped spread-spectrum signal on a first channel, using a predetermined frequency-hopping sequence. The wireless messaging unit 122 attempts 706 to acquire an initial synchronization with a second channel which periodically transmits a synchronization signal in a second plurality of time slots having a predetermined timing relationship with the first plurality of time slots. The synchronization signal includes an identification number for uniquely identifying an order of transmission of the synchronization signal within a predetermined repeating cycle of transmissions. After acquiring the initial synchronization, the wireless messaging unit 122 applies 708 the predetermined timing relationship to the initial synchronization to establish a secondary synchronization with the first channel. The wireless messaging unit 122 then decodes 1404 the identification number and calculates therefrom a point in the predetermined frequency-hopping sequence to use for beginning to transmit the message. The wireless messaging unit 122 then transmits 1406 the inbound message on the first channel in accordance with the secondary synchronization and the calculated point. This embodiment is advantageous, for example, when the second channel is a FLEX™ outbound channel having an FSK synchronization signal, and the first channel is a frequency-hopped spread-spectrum inbound channel used for sending acknowledgments to messages received on the second channel.

Thus, it should be clear from the preceding disclosure that the present invention provides a method and apparatus in a wireless messaging unit for establishing transmitter or receiver synchronization. Advantageously, the method and apparatus does not add great expense to the wireless messaging unit.

Many modifications and variations of the present invention are possible in light of the above teachings. Thus, it is to be understood that, within the scope of the appended claims, the invention can be practiced other than as specifically described herein above.

What is claimed is:

1. A method in a wireless messaging unit for establishing receiver synchronization with a first channel which utilizes a first plurality of time slots for transmission, the method comprising the steps of:

determining that the first channel does not have a signal suitable for acquiring receiver synchronization;

in response, attempting to acquire an initial synchronization with a second channel which periodically transmits a synchronization signal in a second plurality of time slots having a predetermined timing relationship with the first plurality of time slots; and after acquiring the initial synchronization, applying the predetermined timing relationship to the initial synchronization to establish a secondary synchronization with the first channel.

2. The method of claim 1, wherein the first channel is a frequency-hopped, spread-spectrum channel having a predetermined frequency-hopping sequence, and wherein the synchronization signal includes an identification number for uniquely identifying an order of transmission of the synchronization signal within a predetermined repeating cycle of transmissions, and wherein the applying step comprises the step of calculating from the identification number a point in the predetermined frequency-hopping sequence to use for beginning to monitor the first channel.

3. The method of claim 1, wherein the wireless messaging unit includes a transmitter for transmitting an inbound message as a frequency-hopped, spread-spectrum signal having a predetermined frequency-hopping sequence, and wherein the synchronization signal includes an identification number for uniquely identifying an order of transmission of the synchronization signal within a predetermined repeating cycle of transmissions, and wherein the method further comprises the step of calculating from the identification number a point in the predetermined frequency-hopping sequence to use for beginning to transmit the inbound message.

4. The method of claim 1, wherein the first channel is a quadrature amplitude modulated channel having a fine synchronization signal for establishing a fine synchronization after a rough synchronization has been acquired, and wherein the applying step comprises the step of establishing the rough synchronization with the first channel from the initial synchronization, and wherein the method further comprises the step of monitoring the first channel to establish the fine synchronization with the first channel from the fine synchronization signal.

5. The method of claim 1, wherein the wireless messaging unit includes a transmitter for transmitting an inbound message, and wherein the applying step comprises the step of determining when to originate an inbound transmission, from the secondary synchronization.

6. The method of claim 1, wherein the synchronization signal includes an identification number for uniquely identifying an order of transmission of the synchronization signal within a predetermined repeating cycle of transmissions, and wherein the applying step comprises the step of calculating from the identification number a transmission time of a control frame of the first channel.

7. The method of claim 6, further comprising the step of operating in a battery saving mode after the applying step until the transmission time of the control frame.

8. The method of claim 1,
wherein the first channel can operate on a plurality of predetermined frequencies, and
wherein the method further comprises the step of scanning the plurality of predetermined frequencies periodically to locate the first channel.

9. The method of claim 8, further comprising the step of negating the scanning step when the second channel is unavailable.

10. The method of claim 8, further comprising the steps of:
programming the wireless messaging unit with an identifier for identifying a system from which the wireless messaging unit is to receive the second channel; and
negating the scanning step when no second channel having the identifier is available.

11. A wireless messaging unit for establishing receiver synchronization with a first channel which utilizes a first plurality of time slots for transmission, the wireless messaging unit comprising:
a receiver for receiving a message; and
a processing system coupled to the receiver for processing the message, wherein the processing system is programmed to cooperate with the receiver to:
determine that the first channel does not have a signal suitable for acquiring receiver synchronization;
in response, attempt to acquire an initial synchronization with a second channel which periodically transmits a synchronization signal in a second plurality of time slots having a predetermined timing relationship with the first plurality of time slots; and
after acquiring the initial synchronization, apply the predetermined timing relationship to establish a secondary synchronization with the first channel.

12. The wireless messaging unit of claim 11,
wherein the first channel is a frequency-hopped, spread-spectrum channel having a predetermined frequency-hopping sequence, and
wherein the synchronization signal includes an identification number for uniquely identifying an order of transmission of the synchronization signal within a predetermined repeating cycle of transmissions, and
wherein the processing system is further programmed to calculate from the identification number a point in the predetermined frequency-hopping sequence to use for beginning to monitor the first channel.

13. The wireless messaging unit of claim 11,
wherein the wireless messaging unit further comprises a transmitter coupled to the processing system for transmitting an inbound message as a frequency-hopped, spread-spectrum signal having a predetermined frequency-hopping sequence, and
wherein the synchronization signal includes an identification number for uniquely identifying an order of transmission of the synchronization signal within a predetermined repeating cycle of transmissions, and
wherein the processing system is further programmed to calculate from the identification number a point in the predetermined frequency-hopping sequence to use for beginning to transmit the inbound message.

14. The wireless messaging unit of claim 11,
wherein the first channel is a quadrature amplitude modulated channel having a fine synchronization signal for establishing a fine synchronization after a rough synchronization has been acquired, and
wherein the processing system is further programmed to cooperate with the receiver to:
establish the rough synchronization with the first channel from the initial synchronization; and
thereafter monitor the first channel to establish the fine synchronization with the first channel from the fine synchronization signal.

15. The wireless messaging unit of claim 11,
wherein the wireless messaging unit further comprises a transmitter coupled to the processing system for transmitting an inbound message, and
wherein the processing system is further programmed to determine when to originate an inbound transmission, from the secondary synchronization.

16. The wireless messaging unit of claim 11,
wherein the synchronization signal includes an identification number for uniquely identifying an order of transmission of the synchronization signal within a predetermined repeating cycle of transmissions, and
wherein the processing system is further programmed to calculate from the identification number a transmission time of a control frame of the first channel.

17. The wireless messaging unit of claim 16, wherein the processing system is further programmed to operate the wireless messaging unit in a battery saving mode after calculating the transmission time, until the transmission time arrives.

18. The wireless messaging unit of claim 11,
wherein the first channel can operate on a plurality of predetermined frequencies, and
wherein the processing system is further programmed to cooperate with the receiver to scan the plurality of predetermined frequencies periodically to locate the first channel.

19. The wireless messaging unit of claim 18, wherein the processing system is further programmed to stop frequency scanning when the second channel is unavailable.

20. The wireless messaging unit of claim 18,
wherein the processing system is further programmed with an identifier for identifying a system from which the wireless messaging unit is to receive the second channel, and
wherein the processing system is further programmed to stop frequency scanning when no second channel having the identifier is available.

21. A method in a wireless messaging unit for establishing transmitter synchronization with a first channel utilizing a first plurality of time slots, wherein a message is to be transmitted as a frequency-hopped, spread-spectrum signal having a predetermined frequency-hopping sequence, the method comprising the steps of:
attempting to acquire an initial synchronization with a second channel which periodically transmits a synchronization signal in a second plurality of time slots having a predetermined timing relationship with the first plurality of time slots, wherein the synchronization signal includes an identification number for uniquely identifying an order of transmission of the synchronization signal within a predetermined repeating cycle of transmissions;
after acquiring the initial synchronization, applying the predetermined timing relationship to the initial synchronization to establish a secondary synchronization with the first channel; and calculating from the identification number a point in the predetermined frequency-hopping sequence to use for beginning to transmit the message.

22. A wireless messaging unit, comprising:

a transmitter for transmitting a message as a frequency-hopped, spread-spectrum signal on a first channel in a first plurality of time slots having a predetermined frequency-hopping sequence; and a processing system coupled to the transmitter for controlling the transmitter, wherein the processing system is programmed to cooperate with the transmitter to:

attempt to acquire an initial synchronization with a second channel which periodically transmits a synchronization signal in a second plurality of time slots having a predetermined timing relationship with the first plurality of time slots, wherein the synchronization signal includes an identification number for uniquely identifying an order of transmission of the synchronization signal within a predetermined repeating cycle of transmissions;

after acquiring the initial synchronization, apply the predetermined timing relationship to the initial synchronization to establish a secondary synchronization with the first channel; and calculate from the identification number a point in the predetermined frequency-hopping sequence to use for beginning to transmit the message.

* * * * *